United States Patent [19]

Yau et al.

[11] Patent Number: 5,385,773
[45] Date of Patent: Jan. 31, 1995

[54] COPOLYESTER OF CYCLOHEXANENEDIMETHANOL AND PROCESS FOR PRODUCING SUCH POLYESTER

[75] Inventors: Cheuk C. Yau; Clinton Cherry, both of Kingsport, Tenn.

[73] Assignee: Eastman Chemical Company, Kingsport, Tenn.

[21] Appl. No.: 52,978

[22] Filed: Apr. 27, 1993

[51] Int. Cl.$^6$ ............................................. B32B 13/00
[52] U.S. Cl. ................................. 428/221; 528/272; 528/277; 528/279; 528/280; 528/281; 528/283; 528/286; 528/307; 528/308.6; 524/115; 524/431; 524/432; 524/440; 524/706; 524/779; 524/783; 524/785; 428/174
[58] Field of Search ............... 528/272, 277, 279, 281, 528/282, 283, 286, 307, 308.6; 524/115, 431, 432, 440, 706, 779, 783, 785; 428/174, 221

[56] References Cited

U.S. PATENT DOCUMENTS 4,348,510  9/1982  Keck et al. ............................ 528/26
4,499,262  2/1985  Fagerburg et al. ................. 528/279
4,604,453  8/1986  Kuze et al. .......................... 528/481

Primary Examiner—Samuel A. Acquah
Attorney, Agent, or Firm—John F. Stevens; Harry J. Gwinnell

[57] ABSTRACT

Disclosed is a process for producing copolyesters having repeat units from a dicarboxylic acid component comprising at least 90 mol % terephthalic acid and a glycol component comprising about 10–95 mol % 1,4-cyclo-hexanedimethanol and from about 90-5 mol % ethylene glycol comprising reacting the dicarboxylic acid component and the glycol component at temperatures sufficient to effect esterification or transesterification and polycondensing the reaction product in the presence of a catalyst and inhibitor system consisting essentially of Mn, Zn, Ti, Ge and P, all parts by weight based on the weight of the copolyester.

7 Claims, No Drawings

COPOLYESTER OF CYCLOHEXANENEDIMETHANOL AND PROCESS FOR PRODUCING SUCH POLYESTER

TECHNICAL FIELD

The present invention relates to copolyesters of 1,4-cyclohexanedimethanol (CHDM) and a process for producing such copolyesters by esterification (or ester interchange) followed by polycondensation under vacuum for less than about 2 hours in the presence of a selected catalyst and inhibitor system. The product is essentially colorless, clear, and is especially useful in the production of sheet material of about 1/16 to 1 inch (1.6 mm to 25.4 mm) in thickness.

BACKGROUND OF THE INVETION

High quality CHDM modified poly(ethylene terephthalate) (PET) is difficult to manufacture. This is particularly true for those PET's modified with higher levels of CHDM, e.g. greater than 10 mol % CHDM. The choice of catalyst metals is essential to properly manufacture these copolymers with regard to particular properties, such as yellowness and clarity. Titanium catalysts tend to yield copolymers with a yellow coloration. Antimony and cobalt catalysts tend to be reduced to the metal, thus giving a grayish appearance to the copolymers and greatly reduces clarity. Good quality copolymers can only be prepared with the proper choice of catalysts, and the choices are not obvious due to synergistic effects of a certain combination of catalysts.

It has been found that the choice of the proper catalyst system is dependent on the reaction process used. The choice of catalysts as a function of reactor residence time is not obvious because of the response of copolymer properties to the residence time and catalyst levels. Processes with relatively short residence time (shorter than about 2 hours) in the polycondensation reactor calls for an active catalyst system so that the molecular weights can build up quickly in the relatively short time available. Active catalysts such as titanium or gallium yield copolymers with the required rate of molecular weight increase. However, the rates of the side reactions are also fast, so that the resulting copolymer is unacceptably yellow. Stabilization with phosphorus yields good color copolymers but the reaction rate becomes unacceptably slow. Toning with blue toners such as cobalt reduces the clarity of the copolymers.

According to the present invention, a carefully chosen combination of catalysts provides these copolymers with low color and high clarity for reactions with relatively short residence times in the polycondensation reactor.

While all of the catalyst metals have been disclosed for the preparation of polyesters, we are unable to find any prior art that takes advantage of a combination of catalysts with the synergistic effect as we have discovered. Furthermore, we have found no mention in the literature on the important effect of polycondensation time on the choice of catalyst systems and the properties of the copolymers.

EP520051-A1 relates to antimony-free polyesters prepared by transesterification using Mn catalyst, blocking with a phosphorus compound and adding a Ge salt as mixed polycondensation catalyst.

DESCRIPTION OF HTE INVETION

According to the present invention there is provided a process for producing copolyesters having a dicarboxylic acid component and a glycol component, the dicarboxylic acid component comprising repeat units from at least 90 mol % terephthalic acid and the glycol component comprising repeat units from about 10–95 mol % 1,4-cyclohexanedimethanol and from about 90–5 mol % ethylene glycol, the process comprising reacting the dicarboxylic acid component and the glycol component at temperatures sufficient to effect esterification or ester exchange and polycondensing the reaction product under an absolute pressure of less than 10 mm Hg for a time of less than about 2 hours in the presence of a catalyst and inhibitor system consisting essentially of about 0–75 ppm Mn, about 50–150 ppm Zn, about 5–200 ppm Ge, about 5–20 ppm Ti and about 10–80 ppm P, all parts by weight based on the weight of the copolyester.

Also, the present invention provides copolyesters produced by the process described above, and a catalyst and inhibitor system for use in the process.

Either dimethyl terephthalate (or other lower dialkyl terephthalate ester) or terephthalic acid can be used in producing the copolyester. These materials are commercially available.

The glycols used in the copolyester according to the present invention are CHDM and ethylene glycol. Both of these glycols are commercially available.

The copolyesters used in making the articles of this invention have 100 mol % of a dicarboxylic acid portion and 100 mol % of a glycol portion. The dicarboxylic acid portion of the copolyesters comprises repeat units from at least 90 mol % terephthalic acid. Up to about 10 mol % of the dicarboxylic acid repeat units may be from other conventional acids such as those selected from succinic, glutaric, adipic, azelaic, sebacic, fumaric, maleic, itaconic, 1,4-cyclohexane-dicarboxylic, phthalic, isophthalic, and naphthalene dicarboxylic acid.

The glycol component of the copolyesters contain repeat units from about 10–95 mol % 1,4-cyclohexanedimethanol and about 90–5 mol % ethylene glycol. The glycol component may include up to about 10 mol % of conventional glycols such as propylene glycol, 1,3-propanediol; 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, neopentyl glycol, 1,5-pentanediol, 1,6-hexanediol, 1,8-octanediol, 2,2,4-trimethyl-1,6-hexanediol, thiodiethanol, 1,2-cyclohexanedimethanol, 1,3-cyclohexanedimethanol, 2,2,4,4-tetramethyl-1,3-cyclobutanediol and the like.

Generally, the copolyesters may be produced using conventional polyesterification procedures described, for example, in U.S. Pat. Nos. 3,305,604 and 2,901,460, the disclosures of which are incorporated herein by reference. Of course, esters of the acids (e.g., dimethyl terephthalate) may be used in producing the polyesters.

Either the cis or trans isomer of CHDM, or mixture thereof, may be used in accordance with the present invention.

In producing the copolyester according to this invention, a reaction mix of the dicarboxylic acids (or esters as described herein) and glycols is prepared. Ge, Mn and/or Zn are added at the beginning of the process (ester exchange reaction), Ge can be added after esterification or ester exchange if desired. P and Co are added after ester exchange. The catalysts and inhibitors can be mixed or added separately. Preferably, P is added after Co.

In the preparation of polyesters by means of the ester interchange reaction, the process comprises two steps. In the first step, glycol and diester such as dimethyl terephthalate are reacted at elevated temperatures. Thereafter, the reaction product is heated under still higher temperatures and under reduced pressure to form polyester with the elimination of glycol, which is readily volatilized under these conditions and removed from the system. The second step, or polycondensation step, is continued under higher vacuum until a polymer having the desired degree of polymerization, determined by inherent viscosity, is obtained. Without the aid of a suitable catalyst, the above reactions do not proceed at a noticeable rate.

In the preparation of polyester by direct esterification, polyesters are produced by reacting a free dicarboxylic acid with a glycol at a pressure of from about 1 to about 1000 pounds per square inch gauge pressure to produce a low molecular weight linear polyester product having an average degree of polymerization of from about 1.4 to about 10. This low molecular weight polymer can then be polymerized by polycondensation reaction.

The present process can be advantageously operated as a continuous process. High molecular weight linear polyesters can be produced continuously by continuously adding free dicarboxylic acid and glycol to molten low molecular weight linear polyester resin and reacting them while continuously withdrawing low molecular weight resin and introducing the resin withdrawn into a polymerization apparatus and continuously polymerizing it to high molecular weight resin and withdrawing high molecular weight linear polyester resin from the polymerization apparatus.

If used, manganese is preferably used as a salt. Examples of suitable manganese salts are manganous benzoate tetrahydrate, manganese chloride, manganese oxide, manganese acetate, manganese acetylacetonate, manganese succinate, manganese glycoloxide, manganese naphthanate and manganese salicyl salicylate.

The zinc portion ef the catalyst system is preferably added as a salt. Examples of suitable salts include zinc acetate, zinc citrate, zinc lactate, zinc nitrate, zinc glycolate, etc.

The titanium is preferably added as titanium tetraalkoxide, e.g, titanium tetraisopropoxide, titanium tetraethoxide or titanium tetrabutoxide.

The germanium is preferably added as a solution of germanium such as a dioxide dissolved in ethylene glycol with the addition of alkaline metal carbonates or hydroxides such as lithium hydroxide or sodium carbonate.

The phosphorus is preferably added as trialkyl phosphate, triphenyl phosphate, or phosphoric acid.

The blue toner is preferably cobalt, and is preferably added as a salt.

Examples of suitable cobalt salts are cobaltous acetate tetrahydrate, cobaltous phosphate, cobaltous nitrate, cobaltous chloride, cobalt acetylacetonate, cobalt naphthanate and cobalt salicyl salicylate.

The levels of the catalysts and inhibitors used with dimethyl terephthalate based copolymers are as follows:

Mn, from 0 to 75 ppm, preferably from 20 to 50 ppm, (catalyst)

Zn, from 50 to 150 ppm, preferably from 60 to 120 ppm, (catalyst)

Ti, from 5 to 20 ppm, preferably from 10 to 15 ppm (catalyst)

Ge, from 5 to 200 ppm (as residual in the copolymer), preferably from 10 to 40 ppm, (catalyst)

P, from 10 to 80 ppm, (inhibitor)

Co from 5 to 60 ppm or an organic blue toning agent at the proper level to control the color.

The levels of the catalysts for terephthalic acid based copolymers are as follows:

Zn, from 50 to 150 ppm, preferably from 60 to 120 ppm, (catalyst)

Ti from 5–20 ppm, preferably from 10 to 15 ppm

Ge, from 5 to 200 ppm (as residual in the copolymer), preferably from 10 to 40 ppm, (catalyst)

P, from 10 to 80 ppm, (inhibitor)

Co from 5 to 60 ppm or an organic blue toning agent at the proper level to control the color.

The following examples are submitted for a better understanding of the invention:

EXAMPLE 1

Preparation of Poly (co-70-ethylene-30-1,4-cyclohexanedimethylene terephthalate). A 500 mL round-bottom glass flask, equipped with a nitrogen inlet, a condensate outlet, an additive inlet and a stirrer, is charged with 0.5 mol of dimethyl terephthalate, 0,845 mol of ethylene glycol, 0,155 mol of 1,4-cyclohexanedimethanol (CHDM), 25 ppm of Mn as manganese diacetate, 75 ppm of Zn as zinc acetate, 9 ppm of Ti as titanium isopropoxide, and 100 ppm Ge as germanium dioxide. The reaction flask is well purged with nitrogen and immersed into a metal bath preheated to 190° C. The molten mixture is kept at 190° C. for 60 minutes and the temperature is increased to 220° C. After 60 minutes, 49 ppm P as triethyl phosphate was added and the temperature is increased to 290° C. After 25 minutes, vacuum is applied and the pressure reduced to 0.1 mm mercury over the course of 10 minutes. The vacuum and temperature are maintained for 40 minutes and the vacuum is relieved to atmospheric pressure using nitrogen. An essentially colorless and clear polymer melt results. The resulting polymer is separated from the flask and ground to pass a 3 mm mesh screen. Color analysis is b=0.78, a=−0.62, Rd=73.27. I.V. is 0.756.

EXAMPLE 2

Same as Example 1 except amount of CHDM is 0.06 mol, ethylene glycol is 1.0 mol and dimethyl terephthalate is 0.5 mol. Color analysis and I.V. are similar to Example 1.

EXAMPLE 3

Same as Example 1 except amount of CHDM is 0.47 mol, ethylene glycol is 0.12 mol and dimethyl terephthalate is 0.5 mol. Color analysis and I.V. are similar to Example 1.

EXAMPLES 4 THROUGH 9

Example 1 is repeated, using the following levels of catalysts, inhibitor and toner:

| Ex | Ti | Mn | Zn | Ge | P | Co | Color (b) | Clarity | Reflectance (Rd) |
|---|---|---|---|---|---|---|---|---|---|
| 4 | 13 | 0 | 100 | 100 | 50 | 30 | 2.10 | Good | 70.59 |
| 5 | 13 | 75 | 100 | 100 | 50 | 30 | 2.82 | Good | 69.43 |

-continued

| Ex | Ti | Mn | Zn | Ge | P | Co | Color (b) | Clarity | Reflectance (Rd) |
|----|----|----|-----|-----|----|----|------|------|-------|
| 6 | 13 | 40 | 55 | 100 | 50 | 30 | 3.23 | Good | 70.85 |
| 7 | 13 | 40 | 145 | 100 | 50 | 30 | 3.16 | Good | 71.39 |
| 8 | 13 | 40 | 100 | 10 | 50 | 30 | 3.76 | Good | 68.02 |
| 9 | 13 | 40 | 100 | 200 | 50 | 30 | 0.12 | Good | 73.54 |

The color and clarity indicated above is that of the copolyester extruded into a sheet 3.2 mm in thickness.

Catalyst metals, phosphorus and cobalt are given herein as ppm (parts per million) of the element (not the compound) based on the weight of polymer. Calculations are conventional and well known by those skilled in the art. Thus, 98 ppm Ti for a 0.60 mole scale preparation of PET modified with 30 mol % of 1,4-cyclohexanedimethanol is determined as:

$$0.60 \text{ mol} \times \frac{217.8 \text{ g/mol}}{1,000,000} \times 98 = 0.0128 \text{ g Ti}$$

The weight of other catalyst metals or other additives is calculated similarly.

Depending upon the polymer production rate, the catalyst mix feed rate may be varied to provide the desired catalyst level within the range specified by any specific metal, as for 5-20 ppm Ti, for instance. Likewise, depending upon the required catalyst mix feed rate, the concentrations of various components may be adjusted to provide the desired metal to metal ratios in the range of ratios in parts by weight set forth in this specification.

As mentioned previously, the copolyester according to this invention are especially useful as materials for producing thick (1.6 to 25.4 mm) sheet. The sheet material may be produced using extrusion or casting techniques well known in the art.

Whenever the term "inherent viscosity" (I.V.) is used in this application, it will be understood to refer to viscosity determinations made at 25° C. using 0.5 gram of polymer per 100 ml of a solvent composed of 60 wt % phenol and 40 wt % tetrachloroethane.

The color of the polymer is determined using a Gardner XL-23 Tristimulus Colorimeter manufactured by Gardner Laboratory, Inc., Bethesda, Md.

Unless otherwise specified, all parts, percentages, ratios, etc., are by weight. The designation "ppm" indicates parts per million by weight.

The invention has been described in detail with particular reference to preferred embodiments thereof, but it will be understood that variations and modifications can be effected within the spirit and scope of the invention.

We claim:

1. Process for producing copolyester having repeat units consisting essentially of a dicarboxylic acid component consisting essentially of repeat units from at least 90 mol % terephthalic acid and a glycol component comprising repeat units from about 10-95 mol % 1,4-cyclohexanedimethanol and from about 90-5 mol % ethylene glycol comprising reacting said dicarboxylic acid component and said glycol component at temperatures sufficient to effect esterification or trans-esterification and polycondensing said reaction product under absolute pressure of less than 10 mm Hg for a time of less than about 2 hours in the presence of a catalyst and inhibitor system consisting essentially of about 0-75 ppm Mn, about 50-150 ppm Zn, about 5-20 ppm Ti, about 5-200 ppm Ge and about 10-80 ppm P, all parts by weight based on the weight of the copolyester.

2. Process for producing copolyester according to claim 1 wherein said dicarboxylic acid component comprises dimethyl terephthalate.

3. Process for producing copolyester according to claim 1 wherein said dicarboxylic acid component comprises terephthalic acid.

4. Process according to claim 1 wherein a blue toning agent is added to said catalyst system.

5. Process according to claim 4 wherein said blue toning agent is cobalt.

6. Copolyester produced according to the process of claim 1.

7. An extruded sheet having a thickness of about 1.6 mm to about 25.4 mm comprising a copolyester produced by the process of claim 1.

* * * * *